Aug. 9, 1955  D. R. WORKMAN  2,714,971
VACUUM CONTAINERS
Filed April 21, 1952

DONALD R. WORKMAN
INVENTOR.

BY James D. Girman
ATT'Y

United States Patent Office 2,714,971
Patented Aug. 9, 1955

2,714,971

VACUUM CONTAINERS

Donald R. Workman, Portland, Oreg.

Application April 21, 1952, Serial No. 283,361

1 Claim. (Cl. 220—16)

This invention relates to improvements in dishes and more particularly to a dish especially designed for the storage of hot or cold food and either insulated or vacuumized to retain the temperature of its contents at the desired degree of temperature for long periods of time.

A further object is the provision of a lid or closure for the dish which is also insulated or vacuumized and provided with a storage compartment within the lid.

These and other objects will appear as my invention is more fully hereinafter described in the following specification, illustrated in the accompanying drawing, and finally pointed out in the appended claim.

Figure 1:
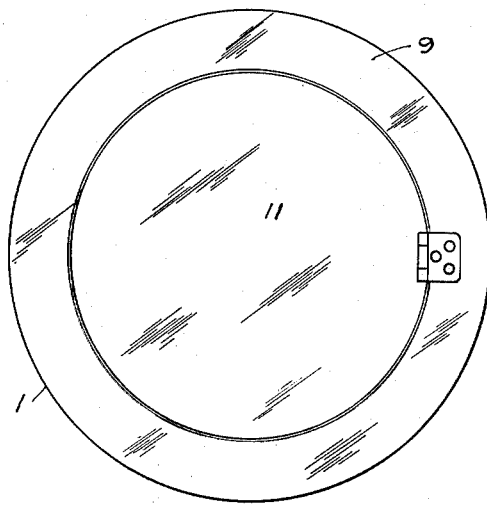
Figure 1 is a top plan view of a dish made in accordance with my invention.
Figure 2:
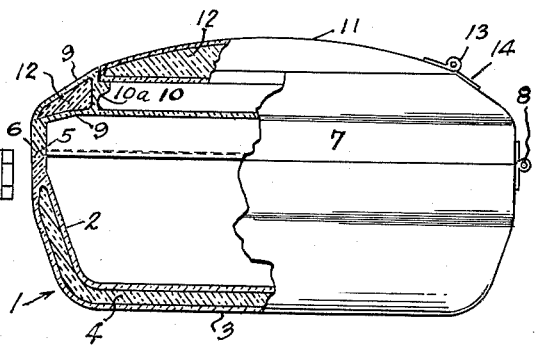
Figure 2 is a side elevation of Figure 1 with fragments broken away and parts in section for convenience of illustration.

Referring now more particularly to the drawing:

In Figures 1 and 2 reference numeral 1 indicates generally a bowl or dish having spaced-apart side and bottom walls 2 and 3, respectively, of double thickness merging into a rim of single thickness and which may be made of glass, plastic, or any other suitable material. The space between the double walls may be provided with insulation as indicated at 4 or this space may be vacuumized by the usual process, which process does not constitute a part of this invention. The rim of the bowl is formed with an annular ridge 5 adapted for engagement with a cooperating annular groove 6 formed around the rim of a lid generally indicated at 7 and which is hingedly attached to the outside wall of the bowl 1 by any approved type of hinge as indicated at 8. The cover is of double wall thickness as at 9 around its marginal edge and formed with a central or concentric recess to form a storage chamber 10 provided with an auxiliary lid 11 also of double wall thickness as shown. When in a closed position the lid rests upon an annular shoulder 10A formed on the inside wall of the chamber. The spacing between the walls of both covers may be filled with insulating material 12 or said space may be vacuumized as aforesaid. The auxiliary lid 11 is hingedly attached as at 13 to the lid 7 by any approved type of hinge 14. If desired the space between the lowermost wall 9 and the rim of the lid 7 may be sealed off by another wall (not shown) and the space between said walls may also be either insulated or vacuumized.

Figure 3:
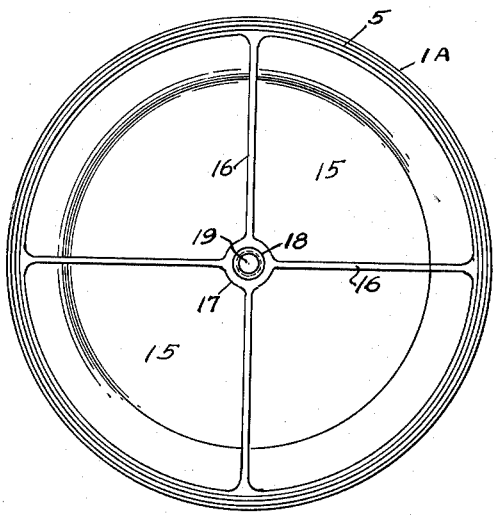
Figure 3 is a top plan view of the dish with the cover removed.

If desired, the interior of the bowl 1 may be divided off into a plurality of compartments 15 (see Figure 3) by intersecting partition walls 16.

Figure 4:
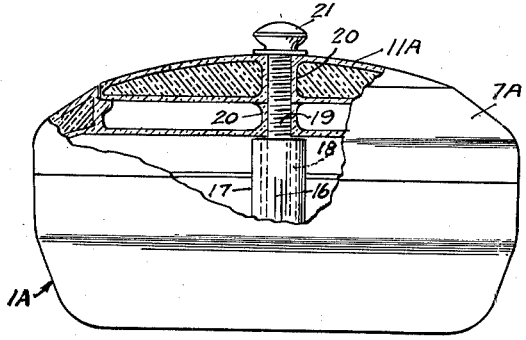
Figure 4 is a view similar to Figure 2 illustrating a modified form of lid or closure for the dish.

In the modification illustrated in Figure 4, the dish proper indicated at 1A is the same as in the other form of the invention and in addition thereto, I provide a center column 17 at the intersection of the partition walls 16. The interior of the column is provided with a cylindrival metallic insert 18 which is internally threaded to receive a bolt 19 which extends upwardly through the cover 7A and the cover 11A which are structurally identical with the corresponding covers 7—11 shown in Figure 2, except that they are provided with internal bushings 20 through which the bolt may pass freely. The top end of the bolt may be provided with any fanciful or ornamental head 21 for convenience in removing the bolt from the column 17 to permit free removal of the lid 11A from the cover 7A and the cover 7A from the bowl 1A. By this arrangement, the lid and cover may be securely locked to each other and the cover 7A locked to the bowl 1A to completely seal the interior of the bowl. The lid 11A may also be provided with any approved type of handle or finger grips for convenience in removing it from the lid 7A.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

An article of the class described comprising in combination a dish having a bottom wall and upwardly diverging side walls of spaced apart double thickness merging into a vertical wall portion of single thickness, a filling of insulating material within the space between said walls, an annular ridge formed on the top surface of said vertical wall portion, a closure lid for said dish, said lid being of spaced apart double wall thickness around its top marginal portion and merging into a downwardly extending rim of single thickness having an annular groove formed on its bottom edge to receive said annular ridge of the dish, a filling of insulating material within the space between said wall portions of the lid, a storage chamber formed within said lid and being of less diameter than that of the lid, an annular shoulder formed on the inside wall of said chamber, a closure lid for said storage chamber adapted to rest upon said annular shoulder within the chamber, said lid for the storage chamber being of spaced apart double wall thickness and provided with a filling of insulating material within said space between the walls, a single hinge connecting the lid for the storage chamber to the lid for the dish and a second hinge connecting the lid for the dish to the dish.

References Cited in the file of this patent

UNITED STATES PATENTS

| | | |
|---|---|---|
| 180,661 | Sidey | Aug. 1, 1876 |
| 298,694 | Jewett | May 13, 1884 |
| 446,254 | Forrester | Feb. 10, 1891 |
| 1,125,371 | Nash | Jan. 19, 1915 |
| 1,249,641 | Lefrancois | Dec. 11, 1917 |
| 1,982,814 | Bissell | Dec. 4, 1934 |
| 2,097,186 | Hinnenkamp | Oct. 26, 1937 |
| 2,349,099 | Kircher | May 16, 1944 |
| 2,435,981 | Rawson | Feb. 17, 1948 |
| 2,491,101 | Freiberg | Dec. 13, 1949 |
| 2,511,710 | Hertzler et al. | June 13, 1950 |